Figure 1:
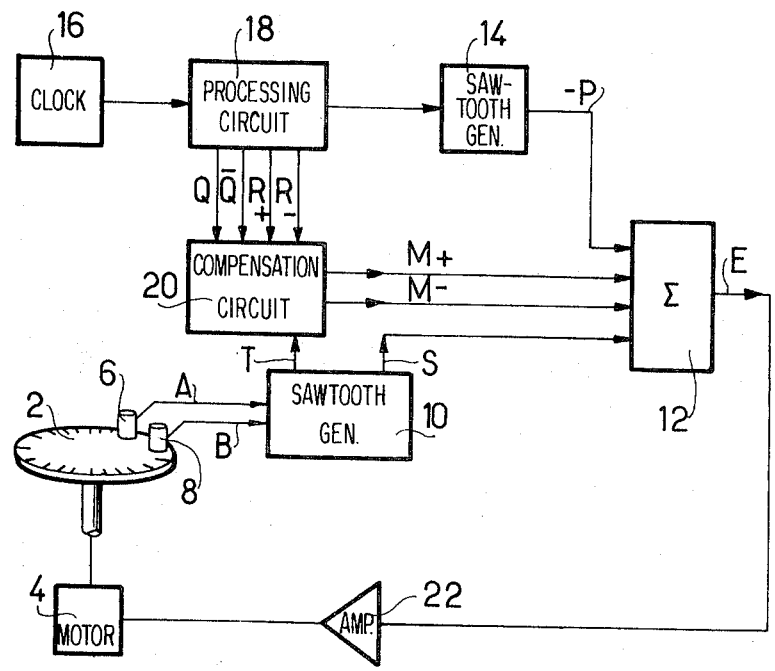

United States Patent
Catherin

[15] 3,654,479
[45] Apr. 4, 1972

[54] MONITORING APPARATUS

[72] Inventor: Jean-Michel Catherin, Savigny-sur-Orge, France

[73] Assignee: Compagnie Generale D'Electricite, Paris, France

[22] Filed: Sept. 24, 1970

[21] Appl. No.: 75,065

[30] Foreign Application Priority Data

Sept. 25, 1969 France....................................693284

[52] U.S. Cl..........................250/231 SE, 250/208, 250/237, 307/311, 318/314, 318/318
[51] Int. Cl.........................................................G01d 5/34
[58] Field of Search................250/208, 209, 219 D, 219 DC, 250/219 DD, 220, 231 SE, 237; 356/169, 170; 307/311; 324/160, 175; 323/21, 22 SC; 318/314, 318, 329

[56] References Cited

UNITED STATES PATENTS 3,505,595 4/1970 Favre.....................................324/160

Primary Examiner—James W. Lawrence
Assistant Examiner—D. C. Nelms
Attorney—Sughrue, Rothwell, Mion, Zinn & Macpeak

[57] ABSTRACT

An apparatus for producing an output signal which is representative of the phase shift between two signals. Two input signals are used to generate a sawtooth signal which is compared to a reference sawtooth signal. The instantaneous amplitude difference between the sawtooth generated by the input and the reference sawtooth is proportional to the phase difference of these signals and an output representative of the phase difference is produced by the apparatus. The output signal can be used, for instance, to control the speed of rotation of an object.

9 Claims, 5 Drawing Figures

PATENTED APR 4 1972

3,654,479

SHEET 1 OF 3

INVENTOR
JEAN-MICHEL CATHERIN

BY Sughrue, Rothwell, Mion,
   Zinn & Macpeak

ATTORNEYS

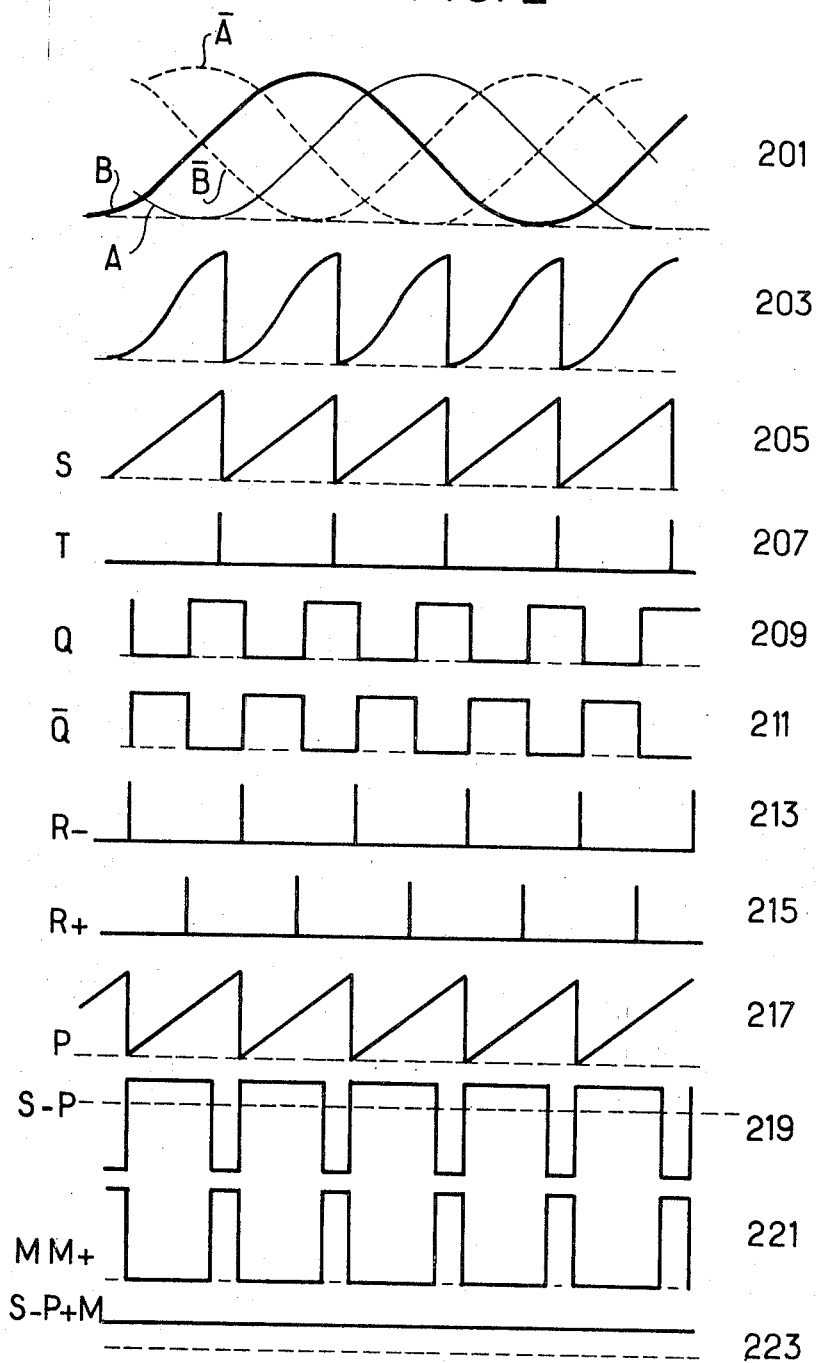

MONITORING APPARATUS

The present invention concerns the monitoring of a time shift, more particularly the formation of a signal representative of the time shift between a pair of input signals of known form and durations which are at least partially coincident. The signal produced may be referred to as a shift signal. The invention is particularly applicable, but not exclusively, to the case where the two input signals are periodic and of neighboring frequencies. In the case of sinusoidal input signals, the monitoring of the time shift corresponds to a phase comparison of the two signals.

Phase comparison is used in speed control systems. The movement of the controlled body is marked by the output signal provided by a pick-up arranged to view a track on the body on which a periodic marking is placed. For example, in the case of controlling the speed of a turntable, it is well known to place on the turntable a circular track with equiangularly spaced striations or equiangular sector-shaped striations of alternate contrasting colors. The frequency of the output signal of the pick-up is proportional to the speed of rotation of the turntable. A phase comparison between this output signal and a reference signal provided by an oscillator whose frequency is well defined, provides an error signal applied to control the turntable device. The speed of the turntable is thus regulated to the oscillator frequency, and thereby stabilized. Several means may be employed to provide high precision with such a control system. First, it is possible to increase the gain of the control loop. It is also possible to provide an error signal which follows as rapidly as possible variations in the shift between the pick-up output signal and the reference signal. However, it is difficult to carry out a phase measurement in a period less than the half-period of the pick-up output signal. This is not too serious when this half-period is small with respect to the response time of the control system, however, when the half period is not small, which is often the case when precise control is necessary, the delay makes the provision of a stable control loop incompatible with a high gain. It is possible to attempt to diminish the value of the half-period of the pick-up output signal by increasing the frequency of the markings carried by the body being monitored. For example, the number of equiangularly spaced striations can be increased. When the speed controlled is relatively low, this increase may be difficult to realize and usually presents a great deal of trouble.

The present invention is intended to provide apparatus for providing a shift signal which follows substantially instantaneously the variations in a time shift between two signals. The apparatus may be used in a speed control system and more particularly in apparatus for monitoring variations in the rotary speed of a rotating body in relation to a reference speed. The regulation is precise even at low speeds of rotation, without requiring any increase in the frequency of the markings carried by the body.

In accordance with a broader aspect of the invention, there is provided apparatus for monitoring variations in a first frequency in relation to a second frequency comprising: a generator providing a first signal A at the first frequency; means for providing a second signal B identical to the first signal and in phase quadrature therewith; a first sawtooth signal source connected to receive the first and second signals and adapted to provide a first sawtooth signal wherein the total duration of four successive cycles of the sawtooth is substantially equal to the period of the first signal and one of the four cycles of the sawtooth is synchronized with the first quarter period of the first signal following a minimum value; a second sawtooth signal source providing a second sawtooth signal identical to the first sawtooth signal when the frequencies are synchronized; and phase-shift measuring circuitry connected to receive the first and second sawtooth signals and arranged to provide an output signal indicative of their phase relation, whereby variations in this output signal reflect variations of the first frequency in relation to the second frequency.

In accordance with a narrower aspect of the invention, there is provided apparatus for monitoring variations in the rotary speed of a rotating body in relation to a reference speed. The apparatus comprises a generator providing a first signal A dependent on the instantaneous angular speed of the body; means for providing a second signal B identical to the first signal and in phase quadrature therewith; a first sawtooth signal source connected to receive the first and second signals and adapted to provide a first sawtooth signal wherein the total duration of four successive cycles is substantially equal to the period of the first signal and one cycle of the sawtooth is synchronized with the first quarter period of the first signal following a minimum value; a second sawtooth signal source providing a second sawtooth signal identical to the first sawtooth signal when the speed of the body is equal to the reference speed; and phase-shift measuring circuitry connected to receive the first and second sawtooth signals and arranged to provide an output signal indicative of their phase relation, whereby variations in this output signal reflect variations in the speed of the body with respect to the reference speed.

The transformation of the first signal into a sawtooth signal provides a continuous shift signal. The first signal, therefore, must have a form known in advance and a variation which is always in the same sense. For example, this signal may be sinusoidal and analyzed between consecutive minimum and maximum values. The evaluation of such a continuous signal provides an immediate deformation of the corresponding sawtooth signal when the first signal changes with respect to the reference. The change produces an immediate change in the shaft signal, and this may be applied to control circuitry for returning the shift signal to its initial state.

In practice, the first signal and the signal providing a reference are usually periodic signals in synchronism. Harmonics or sub-harmonics of these signals provide corresponding sawtooth signals. It is advantageous to provide a shift signal which is not affected by the transitions of the corresponding sawtooth signals. This is accomplished by providing a compensation circuit arranged to avoid changes in the level of the shift signal due to transitions in the sawtooth signals.

The reference signal is generally synchronized by an electronic clock which has a constant frequency. It will be appreciated that the invention may be applied to monitor variations between first and second frequencies which both vary, and variations in a rotary speed which varies in relation to a reference speed which is not constant. The invention, therefore, is applicable to the case where both the pick-up output signal and the reference signal are susceptible to phase changes.

Figure 3:
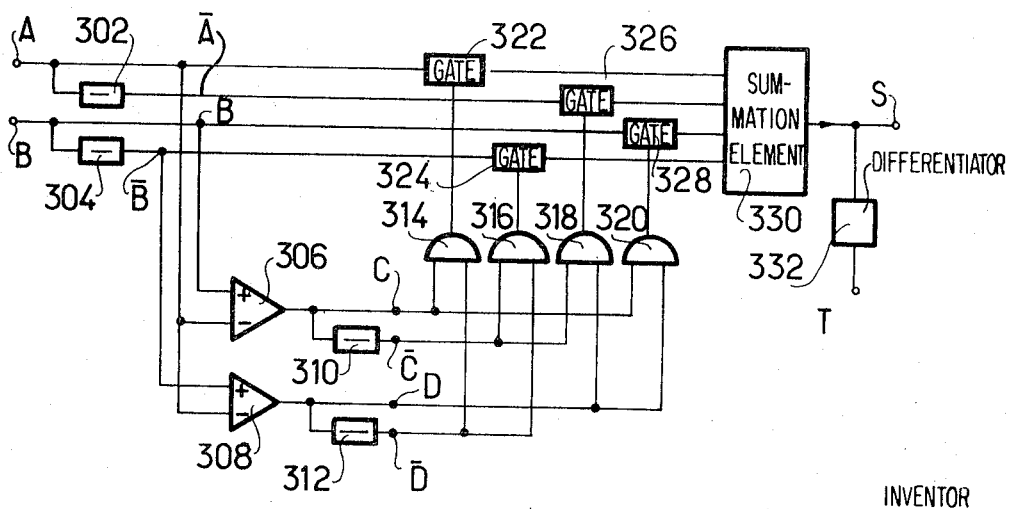
Figure 4:
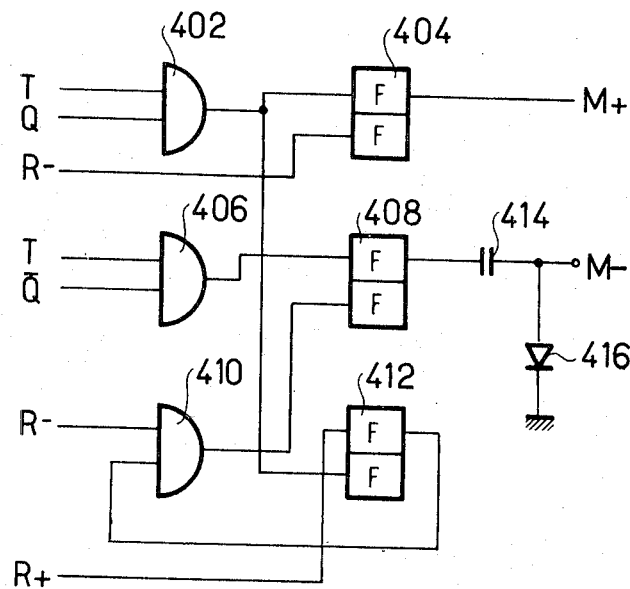
Figure 5:
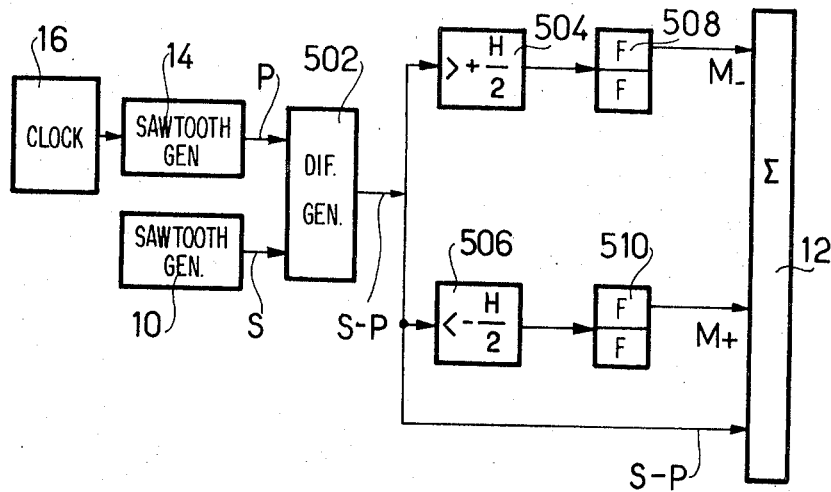

The invention will now be described in more detail, by way of examples only, with reference to the accompanying diagrammatic drawings, in which:

FIG. 1 is a block diagram of a speed regulation system;
FIG. 2 is a diagram showing the waveforms at various points of the circuitry of FIG. 1;
FIG. 3 shows part of the circuitry of FIG. 1 in more detail;
FIG. 4 shows a further part of the circuitry of FIG. 1 in more detail; and
FIG. 5 is a simplified block diagram of a modified version of the circuitry of FIG. 1.

Referring to FIG. 1, the apparatus shown is intended to detect variations in the speed of a turntable 2 driven by an electric motor 4, and to automatically compensate the variations so that the turntable 2 runs at a constant speed. The speed of rotation of the turntable 2 is relatively low.

The turntable 2 is marked with equiangular sector-shaped striations of contrasting colors. The striations are suitably alternating black and white. They cover two tracks on the turntable 2, and as the turntable rotates they pass before two photoelectric elements 6 and 8 arranged to view the striations and to provide respective output signals which are substantially sinusoidal and whose frequency is indicative of the speed of rotation of the turntable. The relative angular positions of the photoelectric elements 6 and 8 are such that their respective output signals are in phase quadrature. These first and second signals will be referred to as signals A and B respectively, and are shown in Section 201 of FIG. 2.

The signals A and B are applied to respective inputs of a first sawtooth signal source 10. One output of source 10 is a sawtooth voltage S synchronized with signals A and B shown in Section 205 of FIG. 2. The duration of each cycle is one quarter period of signal A or signal B.

The signal S is applied to one input of a summing element 12. The summing element receives another input comprising a sawtooth voltage −P provided by a second sawtooth signal source 14. This is synchronized by electronic clock 16 through a processing circuit 18.

Signals M+ and M− are provided by a compensation circuit 20 which is connected to receive from the first sawtooth signal source 10 a signal T. Signal T consists of short pulses coincident with the waveform S falling from its peak value to zero. The compensation circuit 20 receives four signals Q, $\overline{Q}$, R+, and R− from the processing circuit 18. These signals are shown at Sections 209 to 215 of FIG. 2. Signals Q and $\overline{Q}$ are squarewave signals in phase opposition, with unity mark-to-space ratio having the same duration and synchronized with the sawtooth signal P. Signals R+ and R− are short pulses synchronized respectively with the positive-going and negative-going edges of signal Q. The output signal E of the summing element 12 consists of the difference between signals S and P added to the signal M+. It is shown at Section 223 of FIG. 2, and is applied to control circuitry for the electric motor 4 of the turntable indicated schematically as an amplifier 22.

The operation of the circuitry of FIG. 1 is as follows:

The sawtooth signal −P and the signal P which is symmetrically related to −P shown at Section 217 of FIG. 2, have the same slope and amplitude as the sawtooth signal S. When the rotary speed of the turntable 2 reaches the required value, the signal P is identical to the signal S except for a time shift, in other words a phase shift. Thus if the signal S −P is evaluated in the summing element 12 by adding signals S and −P, the rectangular waveform shown at Section 219 of FIG. 2 is obtained.

The signal S −P has only two values, a maximum positive value and a minimum negative value with abrupt transitions between the two occuring at those moments when either the signal S or P has a transition from its peak value to zero.

In the example shown in FIG. 2, it may be considered that the signal S leads the signal P by a quarter of its period. The result is that during three quarters of its period, the signal S −P has a positive value proportional to the lead in question, and that during one quarter of its period it has a negative value equal to this positive value less the common amplitude of the sawtooth signals S and P. The absolute value of this negative amplitude is greater than that of the positive amplitude so that the mean value of the signal S −P over one period is zero. The term "ordinary value" is defined as that value of the signal S −P which it has during the greatest part of its period. The value taken during the rest of a period will be referred to as the "extraordinary value". Thus, in the present case, the ordinary value is the positive one. It can be seen that the ordinary value would be the negative one if the signal S lagged in relation to the signal P.

In all cases, the extraordinary value is greater, in absolute terms, and of the opposite signal than the ordinary value. The difference between the ordinary and extraordinary values is equal to the common amplitude of the signals S and P.

Since these signals are periodic, it will be appreciated that the time shift of signal S with respect to signal P, which may be a positive lead or a negative lag, is only defined to the closest whole number of periods more or less. The simplest solution is to adopt among these different values that which presents the least absolute value, that is to say the one represented by the ordinary value of the signal S −P. This choice is preferable in the example under consideration, relation to speed control, but other choices are evidently possible in different applications. For example, it would be possible to choose a sign for the shift value in advance, that is to say to consider that the signal S is always lagging with respect to the signal P, for example.

The ordinary value of the signal S −P is used to define the signal indicative of the phase shift, and it is therefore advantageous to make this value continuous throughout a period. This is done by adding to the extraordinary value of the signal S −P a compensation signal in the form of signal M whose amplitude is equal to that of the sawtooth signals.

This signal M comprises a train of rectangular pulses with duration less than one half period of the signals S and P, having rising and falling fronts synchronized with the amplitude transitions of these two signals. The signal M is shown in Section 221 of FIG. 2 and when added to the signals S −P shown at Section 219 provides the signal S−P+M shown at Section 223, which is a continuous signal whose amplitude depends on the phase shift between signals S and P.

This signal E follows instantaneously variations in the phase shift between the signals S and P, not only while the signal S −P has its ordinary value, but equally when it has its extraordinary value since the latter is also representative of the phase shift, taking into account a constant value. The signal E is obtained from this extraordinary value by the addition of a corresponding constant value. The signal E is obtained without any filtering operations, so that no inconvenient time constants are introduced.

FIG. 3 shows the first sawtooth signal source 10 in greater detail. It has a pair of input terminals connected to receive signals A and B from the photoelectric elements 6 and 8 (FIG. 1), an output terminal for providing the signal S, and a further output terminal for providing the signal T.

The signals A and B are applied to the respective inputs of a pair of inverters 302 and 304 providing at their outputs the signals $\overline{A}$ and $\overline{B}$. These signals are shown in dotted line at Section 201 of FIG. 2. They consist of signals identical to signals A and B, but in phase opposition thereto.

A first differential amplifier 306 receives the signals A and B and provides an output signal C having a first logical value "one" when signal B exceeds signal A, and the opposite logical value "zero" when signal A exceeds signal B. A second differential amplifier 308 receives signals $\overline{B}$ and A and provides an output signal D with logic value "one" when signal $\overline{B}$ exceeds signal A and of logic value "zero" when signal A exceeds signal $\overline{B}$.

The signals B and D are applied to the respective inputs of a pair of inverters 310 and 312 providing at their outputs respective signals $\overline{C}$ and $\overline{D}$.

A bank of four AND gates 314, 316, 318 and 320 receive the four signals C, D, $\overline{C}$ and $\overline{D}$ in pairs. Gate 314 receives signals C and $\overline{D}$; gate 316 receives $\overline{C}$ and $\overline{D}$; gate 318 receives signals $\overline{C}$ and D; and gate 320 receives signals C and D. The outputs of these four gates are applied to control terminals of respective logic gates 322, 324, 326 and 328 connected to receive the signals A, $\overline{B}$, $\overline{A}$ and B respectively on a further input. The outputs of these gates 322, 324, 326 and 328 are applied to four inputs of a summation element 330 providing the signal S. The output of the summation element is applied to the input of a differentiating circuit 332 whose output consists of the signal T.

The operation of the first sawtooth signal source is as follows:

The summing element 330 receives signal A, signal B, signal $\overline{A}$ and signal $\overline{B}$. It receives signal A, for example, when gate 332 is opened by the output of gate 314, that is to say when the signal C and $\overline{D}$ are both "one". This occurs when signal B exceeds signal A and signal $\overline{A}$ exceeds $\overline{B}$ simultaneously. This occurs during a quarter period of signal A, centered on the passage of signal A through its means value with increasing values. During this quarter period the sinusoidal signal A is substantially rectangular.

It will be appreciated that the other sinusoidal signals B, $\overline{A}$ and $\overline{B}$ are transmitted to the summing element 330 in an analogous fashion, the start of the transmission of each coinciding with the end of transmission of the preceding one. The resulting signal approximates a sawtooth waveform and is shown as Section 203 of FIG. 2. The summing element 330 includes an amplification circuit arranged to correct the slight curvature of the signals shown at Section 203, to provide the output signal S shown at Section 205. This waveform is differentiated by circuit 332 to provide pulses T shown at Section 207.

FIG. 4 shows the compensation circuit 20 of FIG. 1 in more detail. It receives signals T, Q, Q̄ R— and R—. Signals T and Q are applied to the inputs of a first AND gate 402. Signals T and Q̄ are applied to the inputs of a second AND gate 406. The output of gate 402 is connected to the SET input of a flip-flop 404, and also to the RESET input of another flip-flop 412. The RESET input of flip-flop 404 is connected to receive the signal R—. The SET input of flip-flop 421 is connected to receive the signal R+. The output of gate 406 is connected to the SET input of a further flip-flop 408 the RESET input of which is connected to the output of a third AND gate 410. AND gate 410 receives at a first input the signal R— and at a second input the output of flip-flop 412. The output of flip-flop 408 is connected to a terminal through capacitance 414. A diode 416 has its anode connected to this terminal and its cathode grounded. The signal Q takes the logic value "one" during the second half of each sawtooth of signal P. The signal Q̄ takes the logic value one during the other half of each sawtooth.

The flip-flops 404, 408, and 412 have an output with the logical value "one" when a logical "one" is applied to their SET input, this output changing to a logical "zero" when a logical "one" is applied to the RESET input.

The output of flip-flop 408 traverses the capacitance 414 and is clipped by means of the diode 416, so that the output signal M— of the combination comprising this flip-flop, the condenser and the diode, has the logical value "zero" when the flip-flop 408 is energized and the value —H when the flip-flop is deenergized It will be appreciated that in practice, this form of output is obtained by a suitable arrangement of the flip-flop 408 without the use of a capacitance 414 and diode 416. These latter elements have been shown in the Figure simply to facilitate comprehension of the Figure.

The signal M+ provides the compensation signal M where the signal S leads the signal P. The signal M+ is provided by flip-flop 404 when the signal T arrives during the second half of a sawtooth of signal P, that is to say when there is coincidence between a pulse of signal T and the "one" value of Signal Q. This coincidence opens gate 402 whose output signal, coinciding with a pulse of signal T, defines the beginning of a pulse of signal M+. The end of this pulse is brought about by the resetting to "zero" of flip-flop 404 by a pulse of signal R—. It will be seen that the beginning and end of a pulse of signal M+ coincide with the moments of transition in signals S and P.

When the signal S lags with respect to the signal P, this situation not being shown in FIG. 2, gate 406 opens upon coincidence between a pulse of signal T and the "one" value of signal Q̄. Flip-flop 408 is energized simultaneously with this coincidence to return the signal M— to zero. This return to zero constitutes the trailing edge of a pulse of the signal M—, the rising edge having been defined by the resetting to zero of flip-flop 408. This resetting to zero is controlled by a pulse of signal R— immediately preceding the pulse of signal T in question, so that the rising front of the pulse of signal M— coincides with the pulse of signal R—, and the trailing edge of M— coincides with the pulse of signal T. The pulse of signal R— must not, however, act on the flip-flop 408 in the case of an advance of signal S over signal P, since this would cause an untimely appearance of a negative value signal. For this reason, the pulse of signal R— is transferred through the gate 410 which is closed when there is such an advance of signal S over signal P. For this the output pulses of gate 402, signifying such an advance are used to reset to "zero" flip-flop 412 which controls gate 410. The closing of gate 410, by means of the resetting to "zero" of flip-flop 412, must not be permanent, however. Thus flip-flop 412 is energized by the pulses R+. In this way gate 410 is closed at the arrival of a pulse of signal R— in the case of an advance of signal S over signal P, and it is open at the arrival of a pulse of signal R— in the case of a lag of signal S with respect to signal P. There is thus obtained a signal M having the form already described.

It will be appreciated that the signal M may be formed by other forms of circuitry than that shown in FIG. 4.

FIG. 5 shows a circuit for use when the time shift varies relatively little during a signal period, and dispenses with the processing circuit 18. The second sawtooth signal source is controlled directly by the electronic clock 16. Furthermore, the first sawtooth signal source 10 is no longer required to provide pulses such as those of signal T to define the moments of transition in the signal S.

Referring to FIG. 5, the signals S and P provided by the first and second sawtooth signal sources 10 and 14 are applied to a difference generator 502 which provides a signal S —P. This signal is applied to the inputs of a pair of threshold circuits 504 and 506 whose outputs are connected to inputs of respective flip-flops 508 and 510. The outputs of these flip-flops provide the signals M— and M+ respectively. These are applied to a summing element 12 to which the signal S —P is also applied directly.

The threshold circuit 504 is arranged to energize flip-flop 508 when the signal S —P has a value greater than H/2, that is to say half the amplitude of the sawtooth waveforms S and P. The output signal M— of this flip-flop then takes the negative value —H, its value being zero when the flip-flop is not energized. The threshold circuit 507 is arranged to energize flip-flop 510 when the signal S —P has a value less than —H/2, in other words a negative value whose absolute value is greater than H/2. The output signal M+ of flip-flop 510 takes a positive value H when the flip-flop is energized, its value being zero when the flip-flop is not energized. This circuit provides the necessary signal M since the extraordinary values of the signal S —P have absolute values exceeding H/2.

While the invention has been particularly shown and described with reference to preferred embodiments thereof. it will be understood by those skilled in the art that various changes in form and details may be made therein without departing from the spirit and scope of the invention.

I claim:

1. Apparatus for monitoring variations in the rotary speed of a rotating body in relation to a reference speed comprising: a generator means for providing a first signal A dependent upon the instantaneous angular speed of the body; means for providing a second signal B identical to the first signal and in phase quadrature therewith; a first sawtooth signal source means connected to receive the first and second signals and adapted to provide a first sawtooth signal wherein the total duration of four successive cycles is substantially equal to the period of the first signal and one cycle of the four is synchronized with the first quarter period of the first signal following a minimum value; a second sawtooth signal source means for providing a second sawtooth signal identical to the first sawtooth signal when the speed of the body is equal to the reference speed; and phase shift measuring means connected to receive the first and second sawtooth signals and arranged to provide an output signal indicative of their phase relation, whereby variations in the output signal reflect variations in the speed of the body with respect to the reference speed.

2. Apparatus as claimed in claim 1, wherein the generator includes a first pick-up means for sensing markers carried by the body which are equiangularly spaced around the rotation axis of the body.

3. Apparatus as claimed in claim 2, wherein the markers are equiangularly spaced striations on the body perimeter.

4. Apparatus as claimed in claim 2, wherein the markers are equiangular sector-shaped striations carried by a disc rotating with the body and about the same axis as the body.

5. Apparatus as claimed in claim 3, wherein the first pick-up means is a photoelectric element.

6. Apparatus as claimed in claim 2, further comprising a second pick-up means for sensing the markers at a position angularly spaced from that of the first pick-up means.

7. Apparatus as claimed in claim 1, wherein the first sawtooth signal source means includes: first and second inverter means connected to receive the first and second signals respectively and to provide third and fourth signals $\overline{A}$ and $\overline{B}$ respectively, said signals $\overline{A}$ and $\overline{B}$ identical to the first and second signals respectively and in phase opposition thereto; a first comparator means with two inputs connected to receive signals A and B, and to provide at is output a fifth signal C when B exceeds A and no output signal when B is less than A; a second comparator means with two inputs connected to receive two of the signals A and $\overline{B}$ and to provide at its output a sixth signal D when $\overline{B}$ exceeds A and no output signal when $\overline{B}$ is less than A; and four gates each connected to receive one of the signals A, $\overline{A}$, B, $\overline{B}$ and the outputs of the comparator means said gates opening sequentially in the phase order to their respective signals, each for a quarter period of that signal which does not include a maximum or minimum of the signal.

8. Apparatus as claimed in claim 7, wherein each gate is open for a quarter period of its signal starting shortly after the passage of the signal through its minimum value.

9. Apparatus for monitoring variations in a first frequency in relation to a second frequency, comprising: a generator means providing a first signal A at the first frequency; means for providing a second signal B identical to the first signal and in phase quadrature therewith; a first sawtooth signal source means connected to receive the first and second signals and to provide a first sawtooth signal wherein the total duration of four successive cycles is substantially equal to the period of the first signal and one cycle of the four is synchronized with the first quarter period of the first signal following a minimum value; a second sawtooth signal source means for providing a second sawtooth signal identical to the first sawtooth signal when the frequencies are synchronized; and phase shift measuring means connected to receive the first and second sawtooth signals and to provide an output signal indicative of their phase relation, whereby variations in this output signal reflect variations in the first frequency in relation to the second frequency.

* * * * *